United States Patent
McDade et al.

(10) Patent No.: US 11,686,344 B2
(45) Date of Patent: Jun. 27, 2023

(54) BEARING COMPONENT WITH CORE AND SURFACE LATTICE STRUCTURES

(71) Applicant: Roller Bearing Company of America, Inc., Oxford, CT (US)

(72) Inventors: Christopher J. McDade, Tucson, AZ (US); Jeffrey Post, Shelton, CT (US); Anne Marie Stutz, Tucson, AZ (US)

(73) Assignee: Roller Bearing Company of America, Inc., Oxford, CT (US)

( * ) Notice: Subject to any disclaimer, the term of this patent is extended or adjusted under 35 U.S.C. 154(b) by 36 days.

(21) Appl. No.: 17/117,923

(22) Filed: Dec. 10, 2020

(65) Prior Publication Data

US 2021/0180650 A1 Jun. 17, 2021

Related U.S. Application Data

(60) Provisional application No. 62/947,694, filed on Dec. 13, 2019.

(51) Int. Cl.

| | | |
|---|---|---|
| *F16C 23/04* | (2006.01) | |
| *F16C 33/10* | (2006.01) | |
| *F16C 33/12* | (2006.01) | |
| *F16C 17/02* | (2006.01) | |
| *F16C 33/14* | (2006.01) | |

(52) U.S. Cl.
CPC ............ *F16C 23/045* (2013.01); *F16C 17/02* (2013.01); *F16C 33/1095* (2013.01); *F16C 33/12* (2013.01); *F16C 33/14* (2013.01); *F16C 2220/24* (2013.01); *F16C 2226/40* (2013.01)

(58) Field of Classification Search
CPC ........ F16C 17/02; F16C 23/045; F16C 33/08; F16C 33/1095; F16C 33/20; F16C 33/203; F16C 33/205; F16C 33/206; F16C 33/208; F16C 33/12; F16C 33/14; F16C 2220/24; F16C 2226/40; F16C 2226/50; F16C 2226/70; F16C 2226/80
See application file for complete search history.

(56) References Cited

U.S. PATENT DOCUMENTS

| | | | |
|---|---|---|---|
| 5,971,617 A * | 10/1999 | Woelki | F16C 33/208 384/295 |
| 8,728,387 B2 | 5/2014 | Jones et al. | |
| 9,958,011 B2 * | 5/2018 | Polanco | F16C 23/045 |

(Continued)

FOREIGN PATENT DOCUMENTS

| | | |
|---|---|---|
| DE | 10 2017 106234 A1 | 4/2018 |
| EP | 2 505 858 A2 | 10/2012 |

(Continued)

OTHER PUBLICATIONS

Extended European Search Report issued in corresponding EP Application No. 20213313.8, dated May 11, 2021, pp. 1-9.

*Primary Examiner* — Alan B Waits

(74) *Attorney, Agent, or Firm* — Robinson & Cole LLP

(57) ABSTRACT

A light-weight bearing component for sliding or rolling engagement with a mating surface includes a core lattice structure that has a plurality of support members interconnected with one another and a plurality of spaces located between the support members. The bearing component includes a cover that has an interior surface and an exterior surface. The cover extends over a portion of or all of the core lattice structure.

19 Claims, 13 Drawing Sheets

(56) References Cited

U.S. PATENT DOCUMENTS

| | | | |
|---|---|---|---|
| 10,557,464 | B2 | 2/2020 | Scancarello et al. |
| 10,716,673 | B2 | 7/2020 | Jones et al. |
| 2016/0229127 | A1 | 8/2016 | Halliday et al. |
| 2016/0346997 | A1 | 12/2016 | Lewis et al. |
| 2017/0184086 | A1* | 6/2017 | Scancarello ............ F04C 29/02 |
| 2017/0298990 | A1 | 10/2017 | Lozier et al. |
| 2017/0356497 | A1 | 12/2017 | Lozier et al. |
| 2020/0124097 | A1* | 4/2020 | Sottiaux .................. F16F 1/40 |
| 2021/0239160 | A1* | 8/2021 | Hollen .................... F16C 33/32 |

FOREIGN PATENT DOCUMENTS

| | | |
|---|---|---|
| EP | 3477144 B1 | 5/2020 |
| GB | 2 551 434 A | 12/2017 |
| WO | 2013163398 A1 | 10/2013 |
| WO | 2016172452 A1 | 10/2016 |
| WO | 2020102335 A1 | 5/2020 |

* cited by examiner

FIG. 8D1
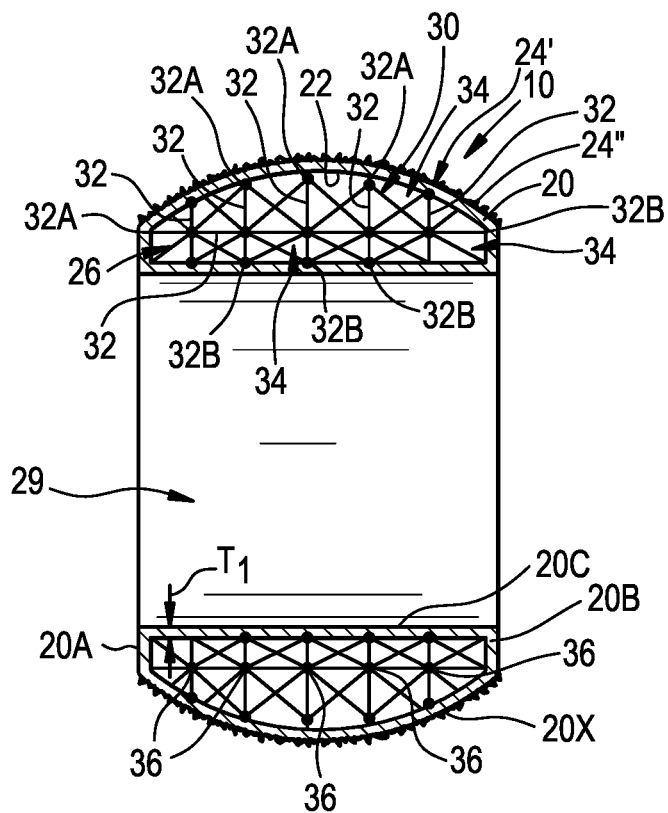
FIG. 8D2
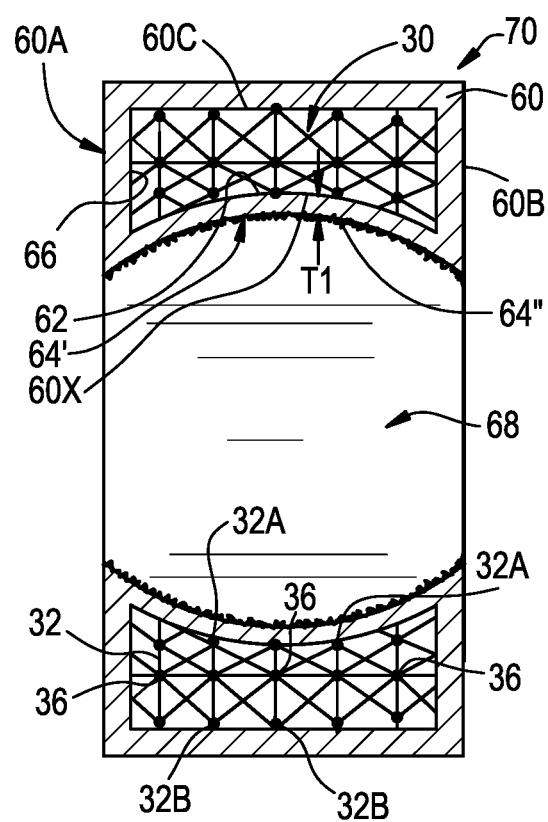

BEARING COMPONENT WITH CORE AND SURFACE LATTICE STRUCTURES

CROSS REFERENCE TO RELATED APPLICATIONS

This application claims the benefit of U.S. Provisional Patent Application Ser. No. 62/947,694 filed on Dec. 13, 2019, which is incorporated herein by reference in its entirety.

TECHNICAL FIELD

The present invention is directed to a bearing component that has a core lattice structure and a cover formed over portions or all of the core lattice structure.

BACKGROUND

Bearings include any friction and wear-reducing machine component that aligns, guides, and supports moving parts. The bearing is often located between a moving part and a stationary part, acting as a connection point between the parts.

Traditional bearing designs use an inner component (e.g., spherical balls, inner race, shaft, stud, etc.) and an outer component (e.g. outer race, track roller, etc.) and roller elements (balls, needles, rollers, hourglass rollers, bearing cages, etc.). Bearing components are manufactured from solid masses of metal using subtractive manufacturing processes in which wrought, cast, or forged material is machined to remove material to obtain a desired shape. The solid metal configuration of typical bearing structures is a significant factor in the overall weight of the final bearing assembly.

In many assemblies, traditional bearings are too heavy and are unable to provide enhanced material properties required by design. In aerospace applications in particular (e.g., fixed wing aircraft and rotorcraft bearings), improved performance through weight reduction is a significant technology driver. State-of-the-art aerospace bearings employ costly manufacturing methods such as hollowing-out of steel or titanium balls, which requires expensive external coating processes (e.g., plasma spray or high velocity oxygen fuel—"HVOF").

Existing methods of determining the extent of wear on bearing surfaces rely on observing component failure and evaluating the duration of in-service times. Wear on prior art bearing components can be localized in certain areas of the surface, such as high points on the surface.

There exists a need for a lightweight bearing that can still meet the same or increased structural demands of a metallic bearing component. There also exists a need for a bearing that clearly identifies when maintenance and/or replacement of the bearing is required.

SUMMARY

The present invention includes a light-weight bearing component for sliding or rolling engagement with a mating surface. The light-weight bearing component includes a core lattice structure that has a plurality of support members interconnected with one another and a plurality of spaces located between the support members. The light-weight bearing component includes a cover that has an interior surface and an exterior surface. The cover extends over the entire core lattice structure or a portion thereof.

In some embodiments, the light-weight bearing component includes a surface lattice structure that extends from (e.g., continuously and outwardly) the exterior surface of the cover and/or a roughened area on the exterior surface of the cover.

In some embodiments, the core lattice structure, the cover, the surface lattice structure and/or the roughened area are formed by an additive manufacturing process.

In some embodiments, the surface lattice structure and/or the roughened area has an adhesive (e.g., an adhesive resin such as an epoxy resin) therein and a self-lubricating liner is adhered to the surface lattice structure and/or the roughened area by the adhesive.

In some embodiments, one or more sensors extend outwardly from the cover and into the self-lubricating liner. The sensors are configured to measure thickness of the self-lubricating liner. In some embodiments, the self-lubricating liner includes polytetrafluoroethylene (PTFE).

In some embodiments, the surface lattice structure and/or the roughened area form a receiving area and a lubricant layer is disposed on and extending into the receiving area. In some embodiments, one or more sensors extend outwardly from the cover and into the lubricant layer. The sensors are configured to measure thickness of the lubricant layer. In some embodiments, the lubricant layer includes polytetrafluoroethylene (PTFE).

In some embodiments, two or more of the plurality of support members are integral with each other.

In some embodiments, two or more of the plurality of support members are connected to each other with a reinforcing member.

In some embodiments, the cover is formed integrally with the core lattice structure and/or the surface lattice structure is formed integrally with the cover.

In some embodiments, the cover is secured to the core lattice structure and/or the surface lattice structure is secured to the cover.

In some embodiments, the core lattice structure and the cover cooperate to provide a uniform load carrying configuration on the cover.

The present invention includes a light-weight bearing assembly that has an outer member bearing component and an inner member bearing component disposed partially in the outer member bearing component. The inner member bearing component and the outer member bearing component are rotatable with respect to each other. The light-weight bearing assembly includes a first core lattice structure that has a plurality of first support members interconnected with one another and a plurality of first spaces located between the first support members. The outer member bearing component has a first cover which has a first exterior surface. The first cover extends over at least a portion of the first core lattice structure. The light-weight bearing assembly includes a second core lattice structure that has a plurality of second support members interconnected with one another and a plurality of second spaces located between the second support members. The inner member bearing component has a second cover which has a second exterior surface. The second cover extends over at least a portion of the second core lattice structure.

In some embodiments, a first surface lattice structure or a first roughened area is on the first exterior surface the first cover and the second exterior surface is a first smooth bearing surface. In some embodiments, and a second surface lattice structure or a second roughened area is on the second exterior surface the second cover and the first exterior surface is a second smooth bearing surface.

In some embodiments, one of the first surface lattice structure, the second surface lattice structure, the first roughened area and the second roughened area has one of a lubricant layer and a self-lubricating liner thereon.

The present invention includes a method of manufacturing a light-weight bearing component. The method includes providing an additive manufacturing system. The method further includes selecting one or more powder materials based upon service parameters of the bearing component and designing a core lattice structure based upon the service parameters of the bearing component. The core lattice structure is made using the additive manufacturing system and using powder materials.

In some embodiments, the method includes applying a cover on the core lattice structure using the additive manufacturing system; and additive manufacturing a surface lattice structure on (e.g., extending continuously and outwardly from) the exterior surface of the cover and/or a roughened area on the exterior surface of the cover.

In some embodiments the method includes applying an adhesive (e.g., an adhesive resin such as an epoxy resin) to the surface lattice structure and/or the roughened area and adhering a self-lubricating liner to the surface lattice structure and/or the roughened area by the adhesive.

In some embodiments the method includes forming a receiving area in the surface lattice structure and/or the roughened area and disposing a lubricant layer on and extending into the receiving area.

The present invention includes a method of manufacturing a light-weight bearing component. The method includes providing an additive manufacturing system and selecting one or more powder materials based upon service parameters of the bearing component. The method includes designing a core lattice structure, a surface lattice structure and a cover using multiple powder materials of varying hardness and strength. The step of varying the hardness and strength of the core lattice structure, the surface lattice structure and the cover optimizes the properties of thereof to meet load requirements and wear requirements.

BRIEF DESCRIPTION OF THE DRAWINGS

FIG. 8D1 is a cross-sectional view of the inner member bearing component, according to an embodiment, showing the first roughened area;

FIG. 8D2 is a cross-sectional view of the outer member bearing component, according to an embodiment, showing the second roughened area.

DETAILED DESCRIPTION

Figure 2A:
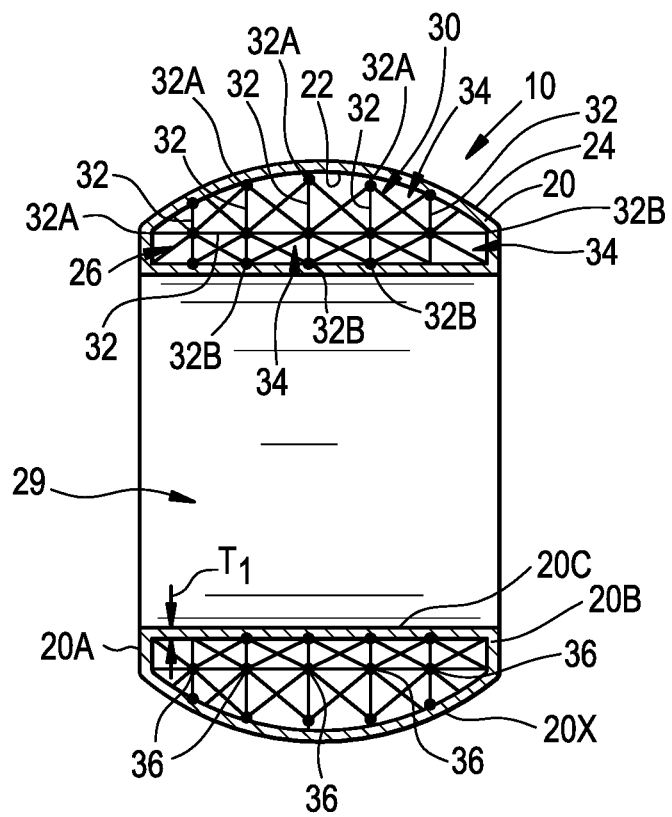
FIG. 2A is a cross-sectional view of the inner member bearing component of FIG. 1 taken along section A-A of FIG. 1.
Figure 2B:
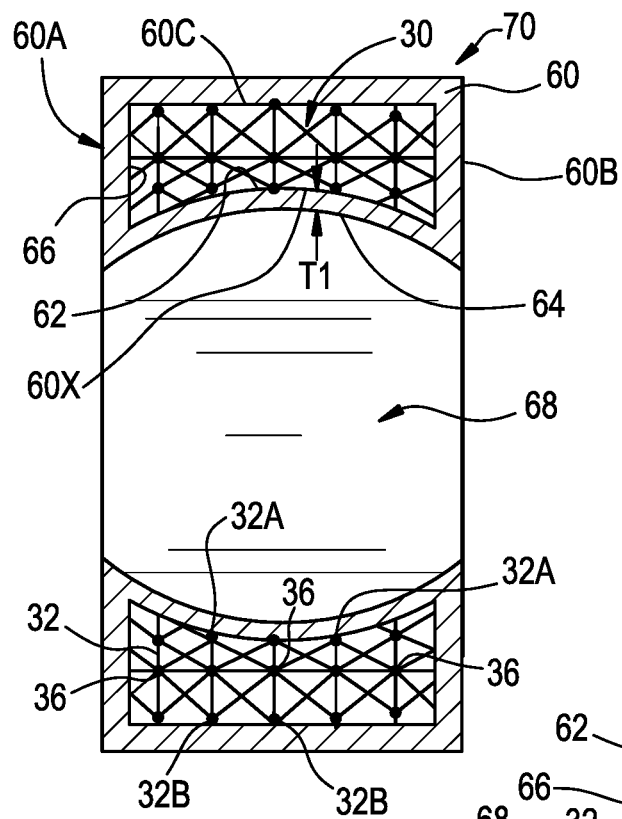
FIG. 2B is a cross-sectional view of the outer member bearing component of the present disclosure.
Figure 2C:
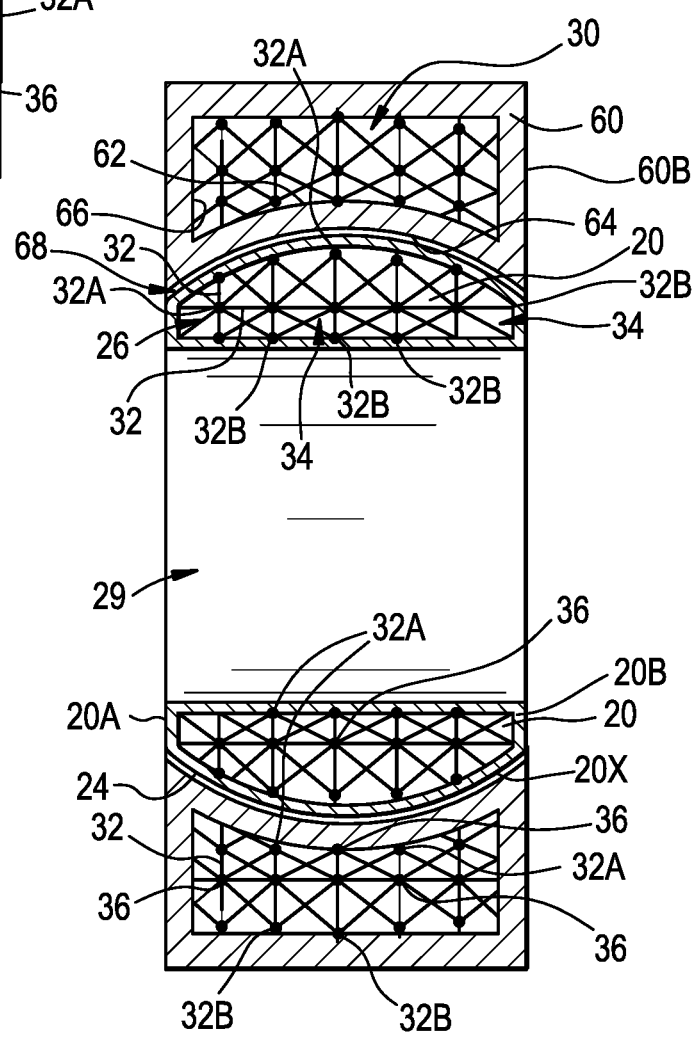
FIG. 2C is a cross-sectional view of a spherical bearing assembly having the inner member bearing component of FIG. 2A disposed in the outer member bearing component of FIG. 2B.
Figure 2D:
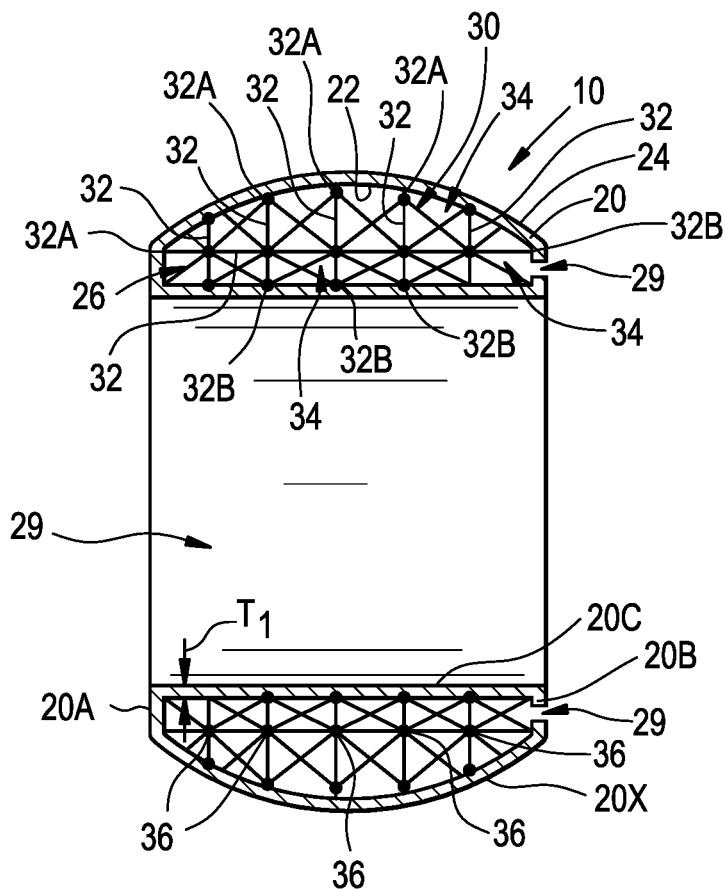
FIG. 2D is a cross-sectional view of the inner member bearing component with a cover with an opening therein.
Figure 2E:
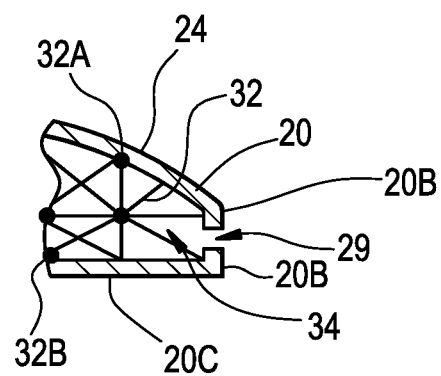
FIG. 2E is an enlarged view of a portion of the inner member bearing component of FIG. 2D showing Detail 2E.
Figure 2F:
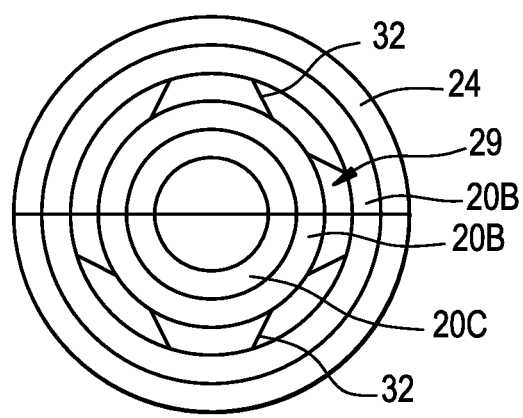
FIG. 2F is a side view of FIG. 2D showing the opening in the cover and viewed in Section 2F, 2G-2F, 2G of FIG. 2D.
Figure 2G:
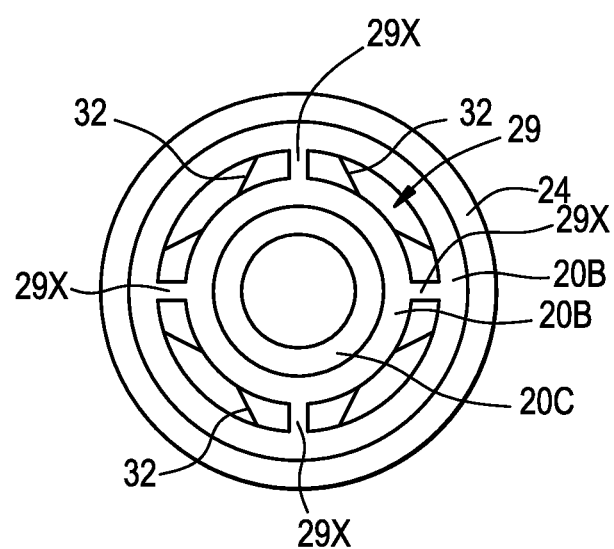
FIG. 2G is a side view of FIG. 2D showing the opening in the cover with webs extend across the opening and viewed in Section 2F, 2G-2F, 2G of FIG. 2D.

As shown in FIG. 2C, a light-weight spherical bearing assembly is generally designated by the reference number 100. The light-weight spherical bearing assembly 100 includes an inner member bearing component which is generally designated by the numeral 10 and an outer member bearing component which is generally designated by the numeral 70. The outer member bearing component 70 has a radially inward facing concave spherical surface 64 that defines an interior area 68 of the outer member bearing component 70. The outer member bearing component 70 has a cylindrical exterior surface 60C. The radially inward facing concave spherical surface 64 and a cylindrical exterior surface 60C each extend between a first axial end 60A and a second axial end 60B of the outer member bearing component 70. The inner member bearing component 10 has a radially outward facing convex spherical surface 24. The inner member bearing component 10 is disposed partially in the interior area 68 of the outer member bearing component 70. The inner member bearing component 10 and the outer member bearing component 70 are configured to angularly misalign (e.g., rotatable with respect to each other) relative to each other such that the radially outward facing convex spherical surface 24 and the radially inward facing concave spherical surface 64 slide against each other.

Referring to FIG. 2A, the inner member bearing component 10 includes a cover 20 which has an interior surface 22 and the radially outward facing convex spherical surface 24 which is formed as part of the cover 20. The interior surface 22 defines an interior area 26 of the inner member bearing component 10. A three-dimensional core lattice structure 30 is disposed within the interior area 26. The core lattice structure 30 is formed by a plurality of support members 32 interconnected with one another. A plurality of spaces 34 are located between the support members 32. The cover 20 illustrated in FIG. 2A extends over the entire lattice structure 30. However, the present invention is not limited in this regard as other configurations may be employed, including, but not limited to, the cover 20 extending over one or more portions of the core lattice structure 30 and/or the cover 20 having one or more openings therein as shown and described herein with reference to FIGS. 2D, 2E, 2F and 2G, for example.

As shown in FIGS. 2D, 2E, 2F and 2G the cover 20 has an opening 29 extending through the second axial end 20B of the cover 20 for the inner member bearing component 10. In the embodiment shown in FIG. 2F, the opening 29 extends entirely and continuously circumferentially around the second axial end 20B. In the embodiment shown in FIG. 2G, the opening 29 extends intermittently circumferentially around the second axial end 20B and is interrupted by radially extending webs 29X. While the opening 29 is shown in the second axial end 20B of the cover 20 for the inner member bearing component 10, the present invention is not limited in this regard as other configurations are contemplated including, but not limited to, more than one opening in the cover 20 of the inner member bearing component 10 and one or more openings in the cover 60 of the outer member bearing component 70.

Referring to FIG. 2B, the outer member bearing component 70 includes a cover 60 which has an interior surface 62 and the radially inward facing concave spherical surface 64 which is formed as part of the cover 60. The interior surface 62 defines an interior area 66 of the outer member bearing component 70. Similar to that described herein for the inner member bearing component 10, the outer member bearing component 70 has the three-dimensional core lattice structure 30 is disposed within the interior area 66. The core lattice structure 30 is formed by the plurality of support members 32 interconnected with one another. The plurality of spaces 34 are located between the support members 32. The cover 60 illustrated in FIG. 2B extends over the entire lattice structure 30. However, the present invention is not limited in this regard as other configurations may be employed, including, but not limited to, the cover 60 extending over one or more portions of the core lattice structure 30 and/or the cover 60 having one or more openings therein similar to those described herein with reference to FIGS. 2D, 2E, 2F and 2G, for example.

Referring to FIG. 2A, the cover 20 for the inner member bearing component 10 is secured to the core lattice structure 30. The cover 20 has a convex spherical section 20X that extends between a first axial end 20A and a second axial end 20B of the cover 20. The cover 20 includes a cylindrical surface 20C that extends between the first axial end 20A and a second axial end 20B and is located radially inward from the convex spherical section 20X. The cover 20 has utility in a bearing assembly as an inner ring of the spherical bearing 100.

Referring to FIG. 2B, the cover 60 for the outer member bearing component 70 is secured to another core lattice structure 30. The cover 60 has a concave spherical section 60X that extends between a first axial end 60A and a second axial end 60B of the cover 60. The cover 60 includes a cylindrical exterior surface 20C that extends between the first axial end 60A and a second axial end 60B and is located radially outward from the concave spherical section 60X. The cover 60 has utility in a bearing assembly as an outer ring of the spherical bearing 100.

As shown in FIG. 2A, the interior surface 22 of the cover 20 is secured (e.g., via an adhesive such as epoxy or phenolic resin, formed integrally with the cover via an additive manufacturing process or via material joining processes such as welding) to support member ends 32A, 32B of the plurality of supports 32. In one embodiment, the cover 20 is made from a harder material than the core lattice structure 30. The cover 20 is bonded to the core lattice structure 30 via structural adhesive (e.g., an adhesive such as epoxy or phenolic resin) or welding. In some embodiments, the cover 20 is integrally formed with the core lattice structure 30 via an additive manufacturing process. The support member ends 32A, 32B of each support member 32 are secured to, define and maintain the contour of the interior surface 22 of the cover 20. In one embodiment, the location of the support member ends 32A, 32B of the support members 32 define and maintain the shape of the radially outward facing convex spherical surface 24 of the cover 20.

As shown in FIG. 2B, the interior surface 62 of the cover 60 is secured (e.g., via an adhesive such as epoxy or phenolic resin, formed integrally with the cover via an additive manufacturing process or via material joining processes such as welding) to support member ends 32A, 32B of the plurality of supports 32. In one embodiment, the cover 60 is made from a harder material than the core lattice structure 30. The cover 60 is bonded to the core lattice structure 30 via structural adhesive (e.g., an adhesive such as epoxy or phenolic resin) or welding. In some embodiments, the cover 60 is integrally formed with the core lattice structure 30 via an additive manufacturing process. The support member ends 32A, 32B of each support member 32 are secured to, define and maintain the contour of the interior surface 62 of the cover 60. In one embodiment, the location of the support member ends 32A, 32B of the support members 32 define and maintain the shape of the radially inward facing concave spherical surface 64 of the cover 60.

As shown in FIG. 2A, the cover 20 has a thickness T1 which is measured between the interior surface 22 and the radially outward facing convex spherical surface 24. The thickness T1 and/or the material of the cover 20 are selected and configured to ensure that the radially outward facing convex spherical surface 24 of the cover 20 remains rigid during use of the bearing component 10. In one embodiment, the thickness T1 of the cover 20 has two or more different thicknesses. For example, the cover 20 has thicker portions at specific locations that experience higher wear or stress, for example portions of the cover 60 that extend between adjacent support member ends 32A or between adjacent support member ends 32B. In one embodiment, the convex spherical section 20X is thicker that the first axial end 20A and the second axial end 20B and the cylindrical surface 20C. In one embodiment the first axial end 20A and the second axial end 20B are thicker than the convex spherical section 20X and the cylindrical surface 20C.

As shown in FIG. 2B, the cover 60 has a thickness T1 which is measured between the interior surface 62 and the radially inward facing concave spherical surface 64. The thickness T1 and/or the material of the cover 60 are selected and configured to ensure that the radially inward facing concave spherical surface 64 of the cover 60 remains rigid during use of the outer member bearing component 70. In one embodiment, the thickness T1 of the cover 60 has two or more different thicknesses. For example, the cover 60 has thicker portions at specific locations that experience higher wear or stress, for example portions of the cover 60 that extend between adjacent support member ends 32A or between adjacent support member ends 32B. In one embodiment, the concave spherical section 60X is thicker that the first axial end 60A and the second axial end 60B and the exterior cylindrical surface 60C. In one embodiment the first axial end 60A and the second axial end 60B are thicker than the convex spherical section 60X and the cylindrical surface 60C.

Figure 5:
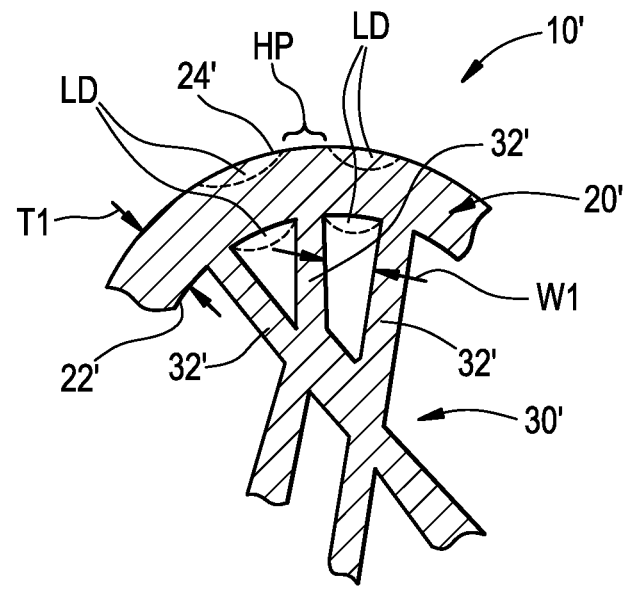
FIG. 5 is a partial cross-sectional view of an alternative bearing component according to the present disclosure.
Figure 8A:
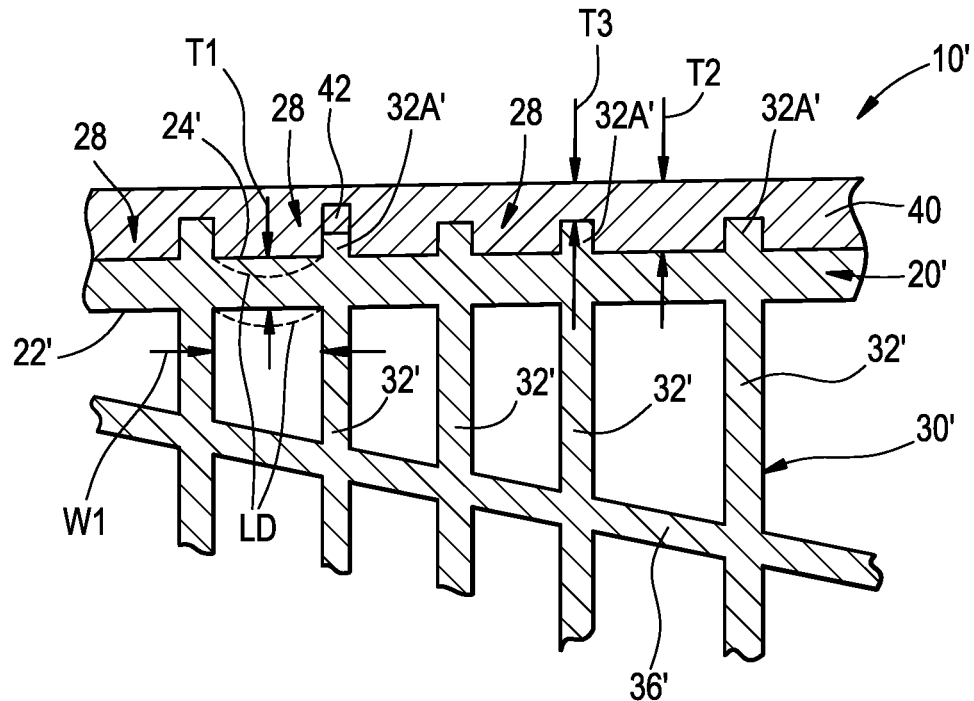
FIG. 8A is a partial cross-sectional view of the bearing component of FIG. 6 including a lubricant layer.

As shown in FIGS. 5 and 8A, the thickness T1 of the cover 20' and the distance W1 between adjacent support members 32 are selected via an iterative analysis and computation to address the problem of localized deflection LD of the cover 20', as indicated by the dashed lines between adjacent support members 32 which results in high points HP on the exterior surface 24'. The inventors have surprisingly discovered that selection of a predetermined thickness T1 of the cover 20, 20', 60 along with a predetermined distance W1 between adjacent support members 32 minimizes or eliminates the localized deflection LD of the cover 20' and eliminates the potential for the high points HP that wear at a higher rate than the localized deflections LD. In some embodiments, the material of the cover 20, 20', 60 is made from a variety of materials of different strengths. For example, portions of the cover 20, 20', 60 extending between the support members 32 is manufactured of a material with a higher strength than the material of other portions of the cover 20, 20', 60. In some embodiments, the portions of the cover 20, 20', 60 extending between the support members 32 have a build-up of material on the inside surface 22' to add strength to the cover 20, 20', 60. In some embodiments, the portions of the cover 20, 20', 60 extending between the support members 32 reinforcing materials such as fibers therein to add strength to the cover 20, 20', 60. Thus, the core lattice structure 30 (e.g., the distance W1 between support members 32) and the cover (e.g., thickness and material of the cover) cooperate to provide a uniform load carrying configuration on the cover 20, 20', 60.

In some embodiments, the cover 20, 20', 60 has a surface hardening treatment (nitriding, carbo-nitriding) thereon to reduce wear of the cover 20, 20', 60. The inventors have surprisingly found that although the core lattice structure 30 creates a non-uniform heat transfer characteristic of the cover 20, 20', 60, that selective surface hardening of the cover 20, 20', 60 increases the wear resistance of the cover 20, 20', 60.

Figure 3:
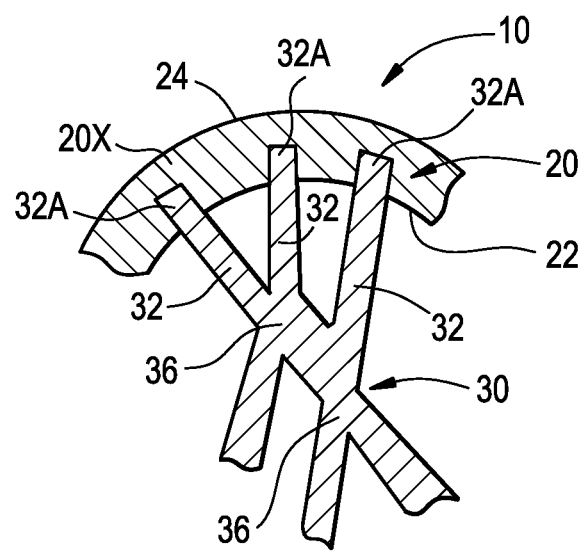
FIG. 3 is a partial cross-sectional view of an alternative bearing component according to the present disclosure.
Figure 6:
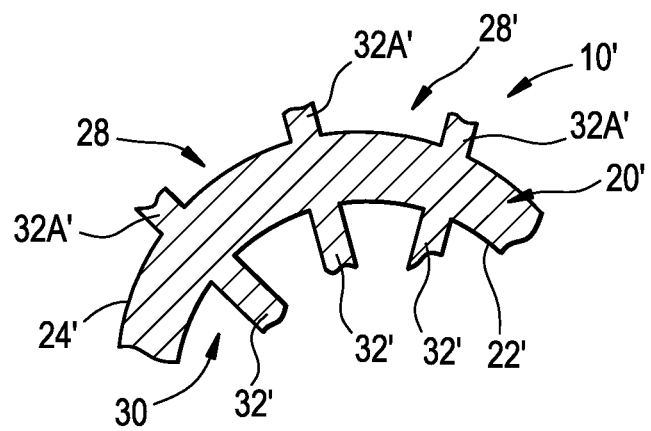
FIG. 6 is a partial cross-sectional view of an alternative bearing component according to the present disclosure.
Figure 7:
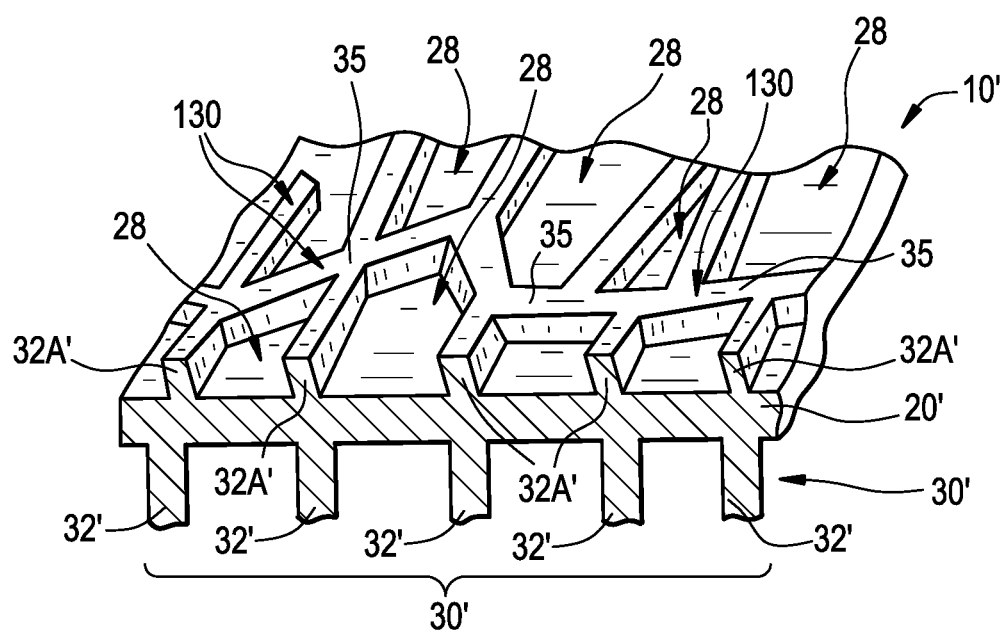
FIG. 7 is a partial perspective cross-sectional view the bearing component of FIG. 6.

As shown in FIG. 3, the support member ends 32A extend into the cover 20 of the inner member bearing component 10. In the embodiment shown in FIG. 4, the support member ends 32A extend through and protrude out of the radially outward facing convex spherical surface 24 of the cover 20. As shown in FIG. 5, the support members 32' are formed integrally with the cover 20'. As shown in FIGS. 6, 7 and 8, the support members 32' are formed integrally with the cover 20'. The support member ends 32A of the outer member bearing component 70 are configured similar to the support member ends 32A of the inner member bearing component 10 including the configurations shown are configured similar to the support member ends 32A as shown in FIGS. 3, 4, 5, 6 and 7 with the exception that the support member ends 32A extend through and protrude out of the radially inward facing concave spherical surface 64. The support member ends 32B of the inner member bearing component 10 and the outer member bearing component 70 are configured similar to the support member ends 32A as shown in FIGS. 3, 4, 5, 6 and 7.

Referring to FIGS. 2A and 2B, a reinforcing member 36 connects adjacent support members 32 to one another. The reinforcing members 36 are placed at specific locations on the support members 32 to join intersecting support members 32 to one another and to provide additional strength to the core lattice structure 30 to better withstand external forces and wear. The reinforcing members 36 are a buildup of material on and around a juncture between intersecting support members 32. In some embodiments, the reinforcing members 36 include fiber strands.

While cover 20 shown and described with reference to FIG. 2A has the convex spherical section 20X and the cylindrical surface 20C both of which extend between the first axial end 20A and the second axial end 20B, the present invention is not limited in this regard as other configurations may be employed including but not limited to the concave spherical section 60X and the exterior cylindrical section 60C both extending between the first axial end 60A and the second axial end 60B as shown in FIG. 2B and other cross-sectional shapes such as cylindrical shapes.

In one embodiment, as depicted in FIG. 3, the support members 32 of the inner member bearing component 10 are integral with each other. In other words, the plurality of support members 32 form a unitary core lattice structure 30. Each of the depicted support members 32 has a support member end 32A that extends through the interior surface 22 into the cover 20. In the embodiment depicted in FIG. 3, the support member ends 32A do not extend through the radially outward facing convex spherical surface 24. In some embodiments, the support members 32 of the outer member bearing component 70 are configured similar to the support members 32 of the inner member bearing component 10 shown in FIG. 3.

Figure 4:
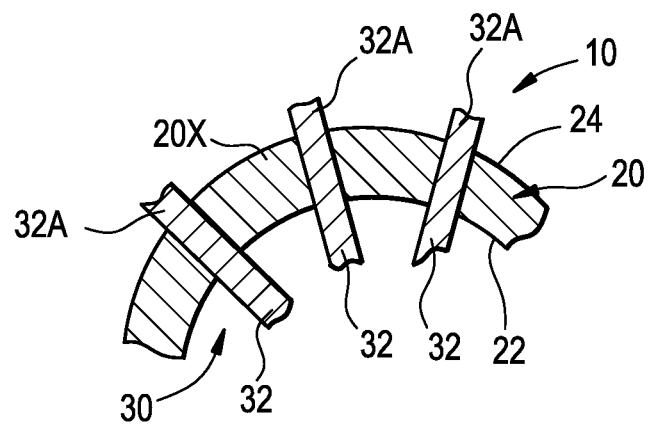
FIG. 4 is a partial cross-sectional view of an alternative bearing component according to the present disclosure.

Referring to FIG. 4, the support members 32 of the inner member bearing component 10 extend through the interior surface 22 and through the radially outward facing convex spherical surface 24 of the cover 20. A portion of the core lattice structure 30 extends outwardly from the radially outward facing convex spherical surface 24 of the cover 20. In some embodiments, the support members 32 of the outer member bearing component 70 are configured similar to the support members 32 of the inner member bearing component 10 shown in FIG. 4.

Referring to FIG. 5, the cover 20' for the inner member bearing component 10 is integral with the core lattice structure 30'. The support members 32' extend through the interior surface 22' of the cover 20' but do not extend through the radially outward facing convex spherical surface 24' of the cover 20'. In some embodiments, the support members 32' of the outer member bearing component 70 are configured similar to the support members 32' of the inner member bearing component 10 shown in FIG. 5.

Figure 8B:
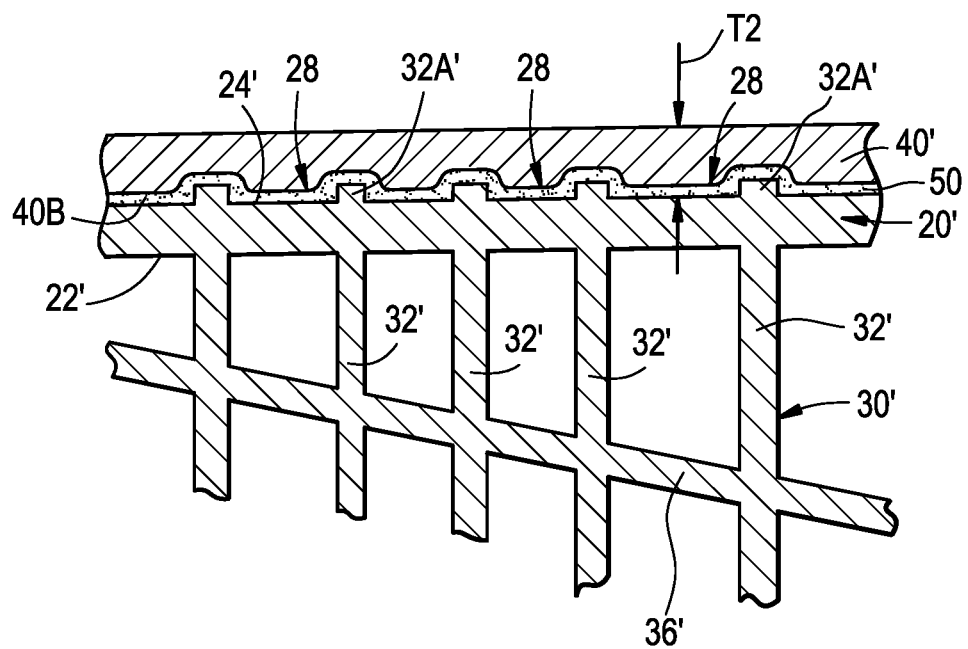
FIG. 8B partial cross-sectional view of the bearing component of FIG. 6 including a self-lubricating liner and an adhesive.

In the embodiment depicted in FIGS. 6, 7, 8A, 8B, 8D and 8E the cover 20' for the inner member bearing component is integral with the core lattice structure 30'. As shown in FIGS. 8A and 8B, a portion of the core lattice structure 30' extends outwardly from the radially outward facing convex spherical surface 24' of the cover 20' (i.e., the support member ends 32A' protrude away from the exterior surface 24'). The support member ends 32A' extend from the radially outward facing convex spherical surface 24' of the cover to form receiving areas 28 for receiving a lubricant layer 40 (depicted in FIG. 8A). The lubricant layer 40 is disposed on (e.g., spread on, molded on, directly bonded on, cured on or formed on) and extends into the receiving areas 28. The lubricant layer 40 extends a thickness T2, measured perpendicularly and radially outward from the radially outward facing convex spherical surface 24' of the cover 20'. In the embodiment depicted in FIG. 8A, the lubricant layer 40 extends a thickness T3 radially outward from the radially outward facing convex spherical surface 24', measured from the outermost edge of the support member ends 32A'. In some embodiments, the lattice structure 30' of the outer member bearing component 70 is configured similar to the lattice structure 30' of the inner member bearing component 10 illustrated in FIGS. FIGS. 6, 7, 8A, 8B, 8D and 8E with the exception that the lubricant layer 40 extends a thickness T2, measured perpendicularly and radially inward from the radially inward facing concave spherical surface 64 of the cover 60.

Figure 8C:
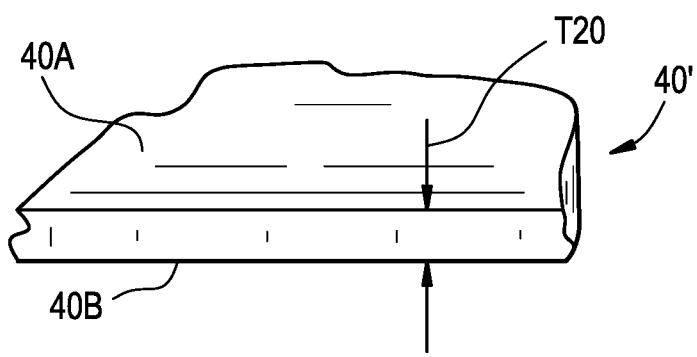
FIG. 8C is a perspective view of the self-lubricating liner of FIG. 8B.

While the lubricant layer 40 is shown and described as being disposed on the receiving area via spreading, molding, direct bonding, curing or forming, the present invention is not limited in this regard as a self-lubricating liner 40' as shown in FIG. 8C having a thickness T20 may be applied to the receiving area 28 and on the radially outward facing convex spherical surface 24' using an adhesive layer 50 (e.g., an epoxy or phenolic resin), as shown in FIG. 8B. A bonding side 40B of the self-lubricating liner 40' conforms to the contour formed by the receiving area 28 and on the radially outward facing convex spherical surface 24' while an exposed surface 40A of the of the self-lubricating liner 40' retains a uniform shape.

In the embodiment depicted in FIG. 8A, a protuberance 42 extends outwardly from the cover 20', 60. In one embodiment, the protuberance 42 is a sensor configured to measure thickness of the lubricant layer 40. The protuberance 42 provides a visual indicator of the extent of wear of the friction-reducing surface finish or lubricant layer 40. The protuberance 42 provides a dimensionally-quantitative verification basis for recommendations for component replacement or refinishing of the lubricant layer 40 or self-lubricating liner 40'.

Figure 8D:
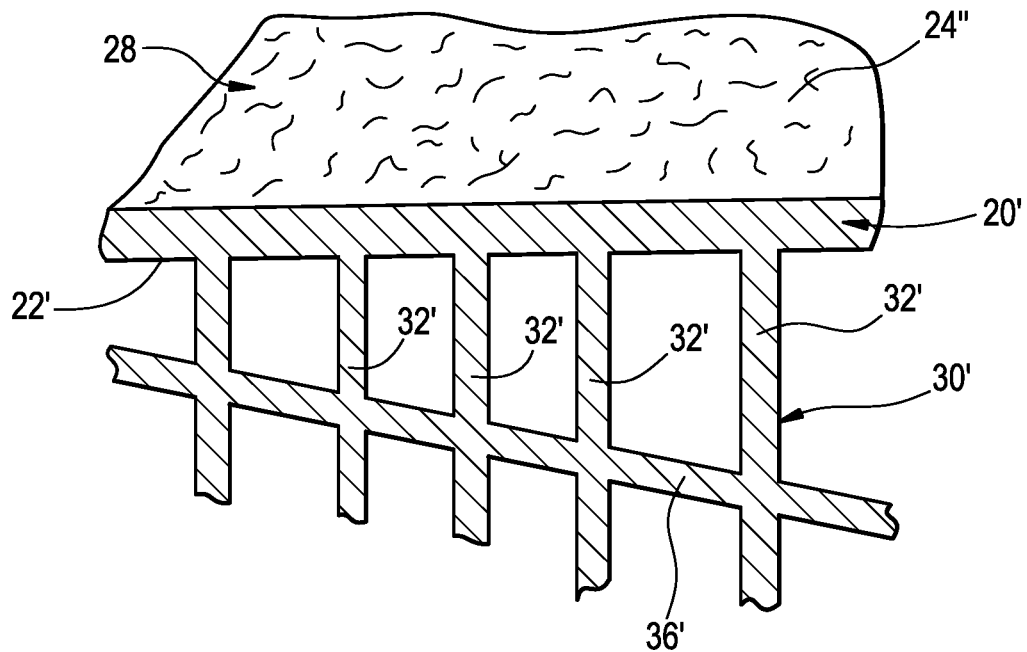
FIG. 8D is perspective cross-sectional view of a bearing component of the present invention showing the cover with a roughened area.
Figure 8E:
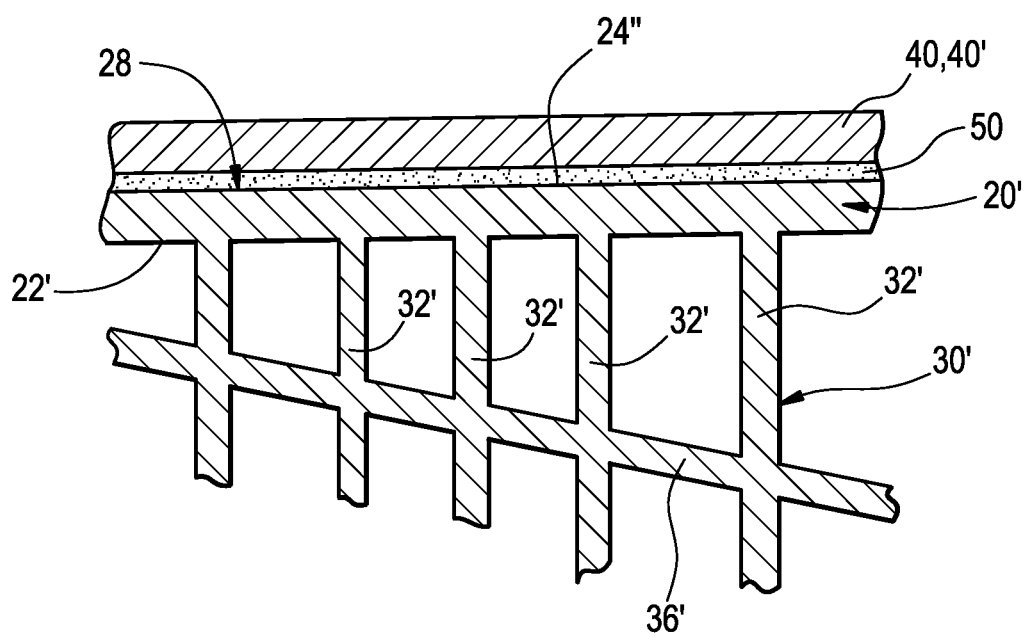
FIG. 8E is a cross-sectional view of FIG. 8D with an adhesive on the roughened surface and the self-lubricating liner of FIG. 8C secured to the roughened area by the adhesive.

As shown in FIGS. 8D and 8E, the receiving area 28 is formed on the cover 20, 20', 60, in the form of a roughened area 24" on the radially outward facing convex spherical surface 24', and a self-lubricating liner 40' is applied to the roughened area 24". Direct bonding of the self-lubricating liner 40' (e.g., PTFE, fabric composite matrix, PTFE molded liner systems, machinable liner systems) to the roughened area 24" saves time and provides uniformity improvements over prior art processes. In one embodiment, the roughened area 24" receives an adhesive resin 50 (e.g., an adhesive such as epoxy or phenolic resin) that aids in the bonding of the self-lubricating liner 40' to the roughened area 24". In other embodiments, the lubricant layer 40 is disposed on (e.g., spread on, molded on, directly bonded on, cured on or formed on) the roughened area 24".

Figure 1:
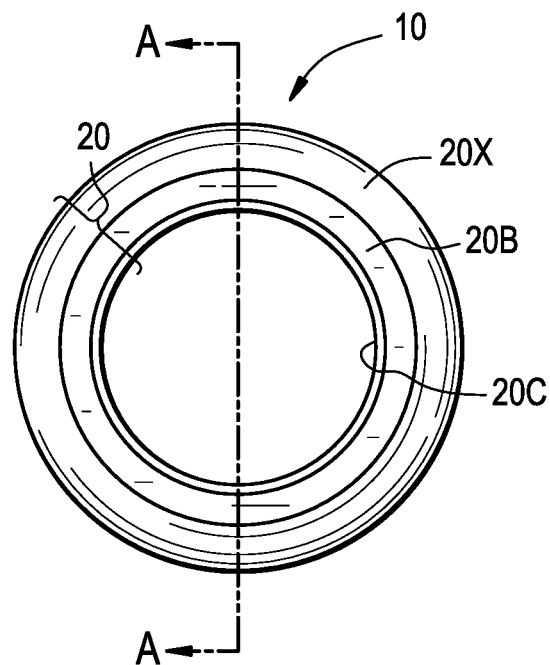
FIG. 1 is a front view of an inner member bearing component according to the present disclosure.

As shown in FIG. 2C, the light-weight bearing assembly 100 includes the outer member bearing component 70 and the inner member bearing component 10 that is disposed partially in the outer member bearing component 70. The inner member bearing component 10 and the outer member bearing component 70 are rotatable with respect to each other. The light-weight bearing assembly 10 includes a first core lattice structure 30 having a plurality of first support members 32 interconnected with one another and a plurality of first spaces 34 located in the interior area 26 between the first support members 32. The outer member bearing component 70 has a first cover 60 having a first exterior surface 64, 60C, 60A and 60B. The first cover 60 extends over at least a portion of the first core lattice structure 30. The outer member bearing component 70 includes a second core lattice structure 30 that has a plurality of second support members 32 interconnected with one another and a plurality of second spaces 34 located between the second support members 32. The inner member bearing component 10 having a second cover 20 having a second exterior surface 24, 20A, 20B and 20C. The second cover 20 extends over at least a portion of the second core lattice structure 30. In some embodiments, the light-weight bearing assembly 100 includes a first surface lattice structure 130 (see FIG. 7) or a first roughened area 24" (see FIGS. 8D and 8D1) on the first exterior surface 24', the first cover 20 and the second exterior surface 64 being a first smooth bearing surface. In some embodiments, the light-weight bearing assembly 100 includes a second surface lattice structure 130 or a second roughened area 64" (see FIG. 8D2) on the second exterior surface 64' the second cover and the first exterior surface being a second smooth bearing surface.

In some embodiments, the first surface lattice structure, the second surface lattice structure, the first roughened area 24" and the second roughened area 64" of the light-weight bearing assembly 100 has either a lubricant layer or a self-lubricating liner thereon.

In one embodiment, the lubricant layer 40 and the self-lubricating liner 40' are made from polytetrafluoroethylene (PTFE), but similar low friction polymeric materials do not depart from the present disclosure.

In one embodiment, as depicted in FIG. 7, inner member bearing component 10', and the outer member bearing component 70 includes a surface lattice structure 130 that is formed integrally with the cover 20', 60. The surface lattice structure 130 extends continuously and outwardly from the cover 20', 60. The surface lattice structure 130 includes load carrying plateaus 35 between the receiving areas 28 for the lubricant layer 40, self-lubricating liner 40 and adhesive 50 to be disposed in. In some embodiments, the receiving areas 28 contains a supply of lubricant (e.g., grease or a dry lubricant powder) that is dispensed over the load-bearing plateaus 35 and in the receiving area 28. The lubricant reduces friction during normal oscillatory motion of the bearing component 10'. The lubricant provides continuous lubrication of the connection points between the stationary and moving parts of the bearing component 10', 70 and/or between two moving parts of the bearing assembly.

While the inner member bearing component 10 and the outer member bearing component 70 is shown and described as having the surface lattice structure 130 that is formed integrally with the cover 20', 60, the present invention is not limited in this regard as other configurations are contemplated including but not limited to the surface lattice structure 130 being formed separately from the cover 20', 60 and secured thereto by a suitable bonding process (e.g., adhesive bonding, welding or brazing).

The inner member bearing component 10, 10', the outer member bearing component 70 including the core lattice structure 30, 30', the support members 32, 32', the cover 20, 20', the roughened area 24", the lubricant layer 40 and the self-lubricating liner 40' are formed using an additive manufacturing system. The additive manufacturing system selects at least one powder material based upon service parameters of the bearing component 10 (e.g., strength, weight, heat resistance, conductivity). A core lattice structure 30 is designed based upon the service parameters of the bearing component 10. The core lattice structure 30 is created by the powder material using the additive manufacturing system and a cover 20 is applied on the core lattice structure 30.

Figure 9:
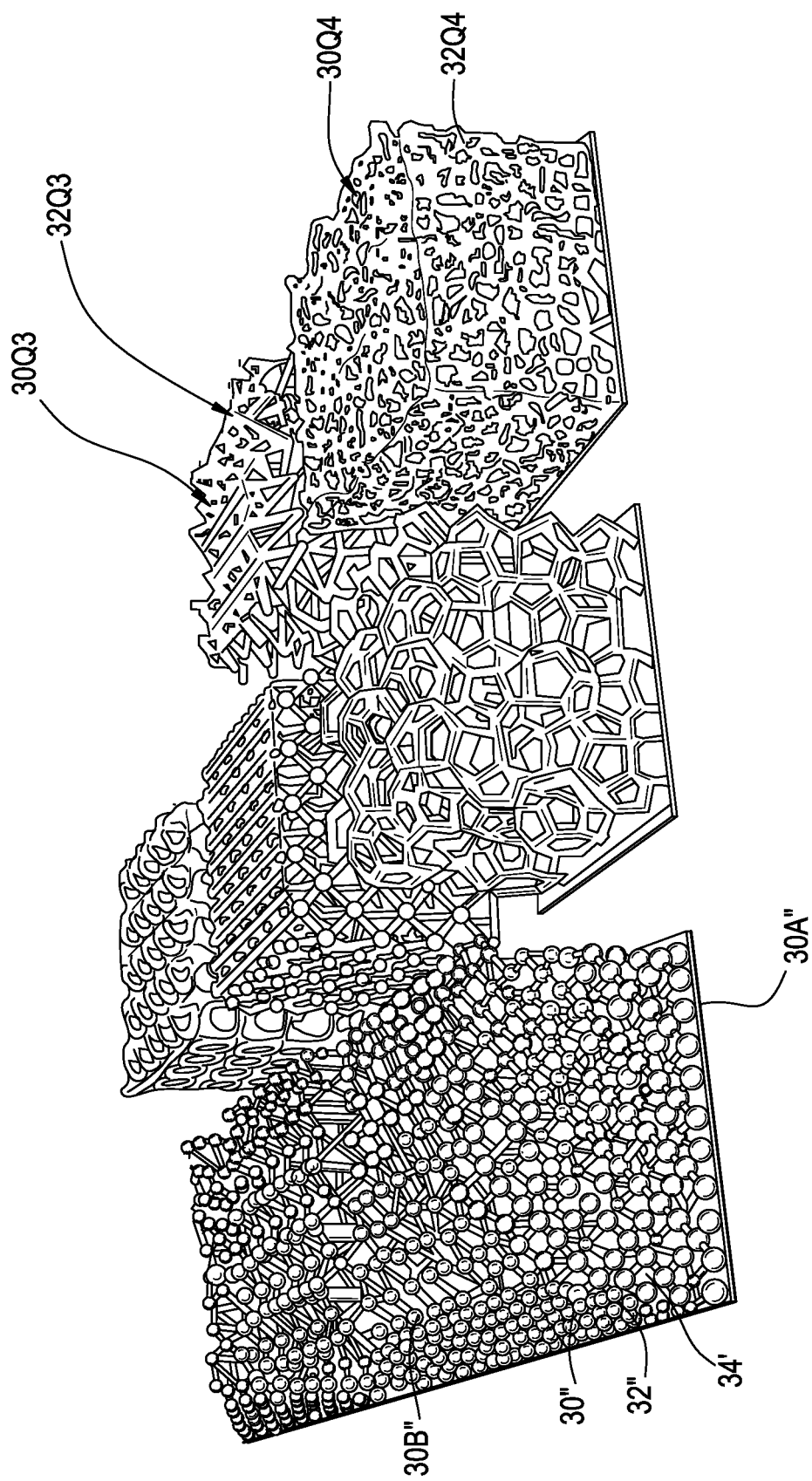
FIG. 9 depicts a number of alternative lattice structures compatible with the bearing component disclosed herein.
Figure 10:
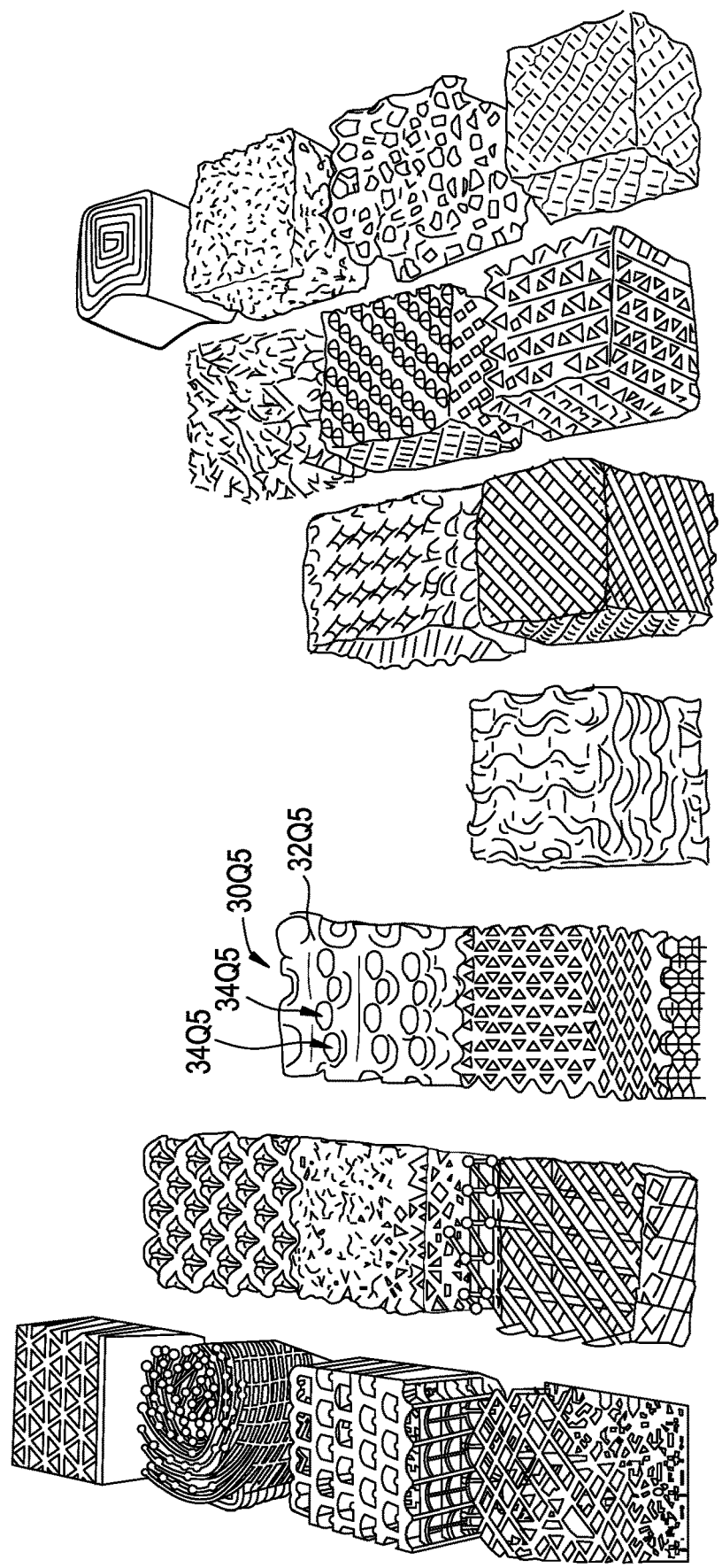
FIG. 10 depicts additional alternative lattice structures compatible with the bearing component disclosed herein.

FIGS. 9 and 10 depict examples of alternative lattice structures compatible with the inner member bearing component 10, 10' and the outer member bearing component 70 disclosed herein. In FIG. 9, the lattice structure 30" has support members 32" that have a greater volume relative to the spaces 34" at a first end 30A" than at a second end 30B". The support members 32" decrease in volume relative to the spaces 34", in other words the spaces 34" between the support members 32" increases, from the first end 30A" to the second end 30B". The lattice structures 30Q3 and 30Q4, as depicted in FIG. 9, have a random arrangement or a pseudo-random arrangement of support members 32Q3, 32Q4. In one embodiment, as depicted in FIG. 10, the lattice structure 30Q5 has hollow support members 32Q5, with spaces 34Q5 between the support members 32Q5 and within each of the support members 32Q5.

The design of the core lattice structure and/or the composition of the powder material is chosen to mechanically optimize the bearing design while also improving the wear resistance of the bearing. The use of the additive powder material (e.g., metals, polymers, fibers, mixtures, etc.) allows further customization of the material beyond those materials produced at the foundry level.

The method of additive manufacturing the bearing component 10 disclosed herein allows tailoring of the material composition to optimize the function of the core lattice structure 30 as a whole (e.g., to strengthen the core lattice structure 30) or by using different powders and/or materials in different parts of the same core lattice structure 30 to enhance wear (e.g., at contact surfaces). In one embodiment, the design of the core lattice structure and cover incorporates using multiple powder materials of varying hardness and strength. The hardness and strength of the core lattice structure and the cover can vary to optimize the properties of the core lattice structure and the cover to meet load requirements and wear requirements.

Utilizing internal cellular architectures, such as the core lattice structure 30 disclosed herein in bearing components 10, 10', provides a 10% to 50% reduction in mass as compared to prior art bearing components manufactured using subtractive manufacturing processes.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A bearing component for sliding or rolling engagement with a mating surface, the bearing component comprising:
   a core lattice structure having a plurality of support members interconnected with one another at reinforcing member sites which comprise fiber strands, and a plurality of spaces located between the support members;
   a cover having an interior surface and an exterior surface, the cover extending over at least a portion of the core lattice structure; and
   a surface lattice structure extending from the exterior surface of the cover, wherein the surface lattice structure is integrally formed with the cover.

2. The bearing component of claim 1, wherein the surface lattice structure comprises a roughened area.

3. The bearing component of claim 2, wherein the core lattice structure, the cover, the surface lattice structure and the roughened area are formed by an additive manufacturing process.

4. The bearing component of claim 2, wherein at least one of the surface lattice structure and the roughened area has an adhesive therein; and
   a self-lubricating liner is adhered to at least one of the surface lattice structure and the roughened area, by the adhesive.

5. The bearing component of claim 4, further comprising at least one sensor extending outwardly from the cover and into the self-lubricating liner, the sensor being configured to measure thickness of the self-lubricating liner.

6. The bearing component of claim 4, wherein the self-lubricating liner comprises polytetrafluoroethylene (PTFE).

7. The bearing component of claim 2, wherein at least one of the surface lattice structure and the roughened area forms a receiving area; and
   a lubricant layer is disposed on and extends into the receiving area.

8. The bearing component of claim 7, further comprising at least one sensor extending outwardly from the cover and into the lubricant layer, the sensor being configured to measure thickness of the lubricant layer.

9. The bearing component of claim 7, wherein the lubricant layer comprises polytetrafluoroethylene (PTFE).

10. The bearing component of claim 1, wherein at least two of the plurality of support members are integral with each other.

11. The bearing component of claim 1, wherein the fiber strands constitute reinforcing members.

12. The bearing component of claim 1, wherein the cover is formed integrally with the core lattice structure.

13. The bearing component of claim 1, wherein the cover is secured to the core lattice structure.

14. The bearing component of claim 1, wherein the core lattice structure and the cover cooperate to provide a uniform load carrying configuration on the cover.

15. The bearing component of claim 1, wherein the cover is connected to at least some of the plurality of support members, and wherein reinforcing fibers are disposed in the cover and extend between the plurality of support members such that the cover is configured for uniform load carrying capability.

16. A bearing assembly comprising:
    an outer member bearing component;
    an inner member bearing component disposed partially in the outer member bearing component, the inner member bearing component and the outer member bearing component being rotatable with respect to each other;
    a first core lattice structure having a plurality of first support members interconnected with one another and a plurality of first spaces located between the first support members;
    the outer member bearing component having a first cover having a first exterior surface, the first cover extending over at least a portion of the first core lattice structure;
    a second core lattice structure having a plurality of second support members interconnected with one another and a plurality of second spaces located between the second support members;
    the inner member bearing component having a second cover having a second exterior surface, the second cover extending over at least a portion of the second core lattice structure;
    a first surface lattice structure extending from the first exterior surface of the first cover, wherein the first surface lattice structure is formed integrally with the first cover; and
    a second surface lattice structure extending from the second exterior surface of the second cover, wherein the second surface lattice structure is formed integrally with the second cover.

17. The bearing assembly of claim 16, further comprising one of:
   (a) the first surface lattice structure comprising a first roughened area on the first exterior surface of the first cover and the second exterior surface being a first bearing surface; and
   (b) the second surface lattice structure comprising a second roughened area on the second exterior surface of the second cover and the first exterior surface being a second bearing surface.

18. The bearing assembly of claim 17, wherein one of the first surface lattice structure, the second surface lattice structure, the first roughened area and the second roughened area comprises one of a lubricant layer and a self-lubricating liner thereon.

19. The bearing assembly of claim 16, wherein the plurality of first support members are interconnected with one another at first reinforcing member sites which comprise first fiber strands, and the plurality of second support members are interconnected with one another at second reinforcing member sites which comprise second fiber strands.

* * * * *